United States Patent
Yokota et al.

(10) Patent No.: US 10,498,202 B2
(45) Date of Patent: Dec. 3, 2019

(54) MANUFACTURING METHOD FOR ROTOR FOR ROTARY ELECTRIC MACHINE

(71) Applicant: Mitsubishi Electric Corporation, Chiyoda-ku, Tokyo (JP)

(72) Inventors: Hirohisa Yokota, Tokyo (JP); Akihiro Yamamura, Tokyo (JP); Yoshinobu Sugimoto, Tokyo (JP); Shinji Sano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 406 days.

(21) Appl. No.: 15/292,257

(22) Filed: Oct. 13, 2016

(65) Prior Publication Data
US 2017/0302141 A1    Oct. 19, 2017

(30) Foreign Application Priority Data
Apr. 14, 2016 (JP) .................................. 2016-080788

(51) Int. Cl.
*H02K 15/03* (2006.01)
*H02K 15/12* (2006.01)

(52) U.S. Cl.
CPC ............. *H02K 15/03* (2013.01); *H02K 15/12* (2013.01)

(58) Field of Classification Search
CPC ........ H02K 15/03; H02K 15/12; H02K 15/00; H02K 1/28; Y10T 29/49012
(Continued)

(56) References Cited

U.S. PATENT DOCUMENTS 3,488,837 A * 1/1970 Khadr ............... H02K 3/00
                                                    29/598
4,193,184 A * 3/1980 Futterer ............ H02K 1/17
                                                    29/596
(Continued)

FOREIGN PATENT DOCUMENTS

CN    204886469 U    12/2015
JP    11-252839 A     9/1999
(Continued)

OTHER PUBLICATIONS

Communication dated Jan. 3, 2019 from the State Intellectual Property Office of the P.R.C. in counterpart Application No. 201611151655.4.

*Primary Examiner* — Peter Dungba Vo
*Assistant Examiner* — Kaying Kue
(74) *Attorney, Agent, or Firm* — Sughrue Mion, PLLC; Richard C. Turner

(57) ABSTRACT

The manufacturing method for a rotor includes steps of: applying an adhesive to a first surface of a magnet material member that becomes a permanent magnet after magnetization, the adhesive being applied such that a total thickness of the magnet material member and the adhesive is less than a radial width of a magnet insertion aperture; disposing a rotor core such that an axial direction thereof is horizontal, and inserting the magnet material member into a magnet insertion aperture that is positioned vertically uppermost among the magnet insertion apertures so as to orient the adhesive vertically upward; positioning each of the magnet material members by pressing the magnet material member against an inner wall surface on an outer circumferential side of the magnet insertion aperture after inserting the magnet material member into each of the magnet insertion apertures;
(Continued)

and curing the adhesive after the magnet material member is positioned.

10 Claims, 6 Drawing Sheets

(58) Field of Classification Search
USPC .......................................... 29/596, 597, 598
See application file for complete search history.

(56) References Cited

U.S. PATENT DOCUMENTS

| | | | | |
|---|---|---|---|---|
| 5,040,286 A * | 8/1991 | Stark | ................... | H01F 41/0253 |
| | | | | 29/598 |
| 5,117,553 A * | 6/1992 | Kliman | ................ | H02K 1/2766 |
| | | | | 29/447 |
| 6,161,275 A * | 12/2000 | Moss | .................... | H01R 39/06 |
| | | | | 29/597 |
| 6,342,745 B1 * | 1/2002 | Sakai | .................... | H02K 1/246 |
| | | | | 310/156.07 |
| 9,431,860 B2 * | 8/2016 | Endo | .................... | H02K 1/2766 |
| 2002/0047435 A1 * | 4/2002 | Takahashi | ............... | H02K 1/246 |
| | | | | 310/156.56 |
| 2004/0217666 A1 * | 11/2004 | Mellor | ................... | H02K 1/276 |
| | | | | 310/156.53 |
| 2007/0205686 A1 * | 9/2007 | Ishida | .................... | H02K 1/276 |
| | | | | 310/156.21 |
| 2008/0238219 A1 * | 10/2008 | Hoshino | ................ | H02K 1/274 |
| | | | | 310/400 |
| 2009/0026867 A1 * | 1/2009 | Haruno | ................ | H02K 1/2766 |
| | | | | 310/156.21 |
| 2009/0045689 A1 * | 2/2009 | Haruno | .................. | H02K 1/276 |
| | | | | 310/156.56 |
| 2012/0139378 A1 * | 6/2012 | Endo | .................... | H02K 1/2766 |
| | | | | 310/156.21 |
| 2014/0042856 A1 * | 2/2014 | Miyashita | .............. | H02K 1/276 |
| | | | | 310/156.21 |
| 2014/0241914 A1 * | 8/2014 | Ojima | .................... | H02K 1/276 |
| | | | | 417/410.1 |
| 2016/0315512 A1 * | 10/2016 | Fubuki | ................... | H02K 1/276 |
| 2018/0248453 A1 * | 8/2018 | Nakayama | ............... | H02K 1/27 |
| 2019/0097478 A1 * | 3/2019 | Katayama | ................ | H02K 1/27 |

FOREIGN PATENT DOCUMENTS

| | | |
|---|---|---|
| JP | 2000-316243 A | 11/2000 |
| JP | 2010141989 A * | 6/2010 |
| JP | 2015-204693 A | 11/2015 |

* cited by examiner

MANUFACTURING METHOD FOR ROTOR FOR ROTARY ELECTRIC MACHINE

BACKGROUND OF THE INVENTION

1. Field of the Invention

The present invention relates to a manufacturing method for a rotor for a rotary electric machine such as an electric motor or a generator, for example, and particularly relates to a method for positioning and fixing magnets to a rotor core.

2. Description of the Related Art

An alternating-current motor, which constitutes a rotary electric machine has: a stator; and a rotor that is driven to rotate by the stator. The stator generally has: a stator core that is produced by laminating and integrating electromagnetic steel sheets that have a sheet thickness of 0.25 mm through 0.5 mm; and a stator winding that is wound onto the stator core, and is configured such that a rotating magnetic field is formed inside the stator by passing alternating current to the stator winding. The rotor, on the other hand, has a rotor core that is produced using a solid body of magnetic material, or by laminating and integrating electromagnetic steel sheets, and rotates at a rotational speed that is determined by the frequency of the electric current in the rotating magnetic field and the number of poles in the rotating magnetic field that is formed inside the stator.

In recent years, conventional alternating-current motors have been proposed in which rotors are rotated more efficiently by embedding permanent magnets in a rotor core, and using torque from the permanent magnets and reluctance torque from the rotor core.

In these conventional alternating-current motors, permanent magnets are inserted into magnet insertion apertures that are formed on the rotor core, and are fixed to the rotor core using adhesive. Since the permanent magnets are inserted into magnet insertion apertures, gaps are formed between the inserted permanent magnets and the magnet insertion apertures because the magnet insertion apertures are formed so as to have aperture shapes that are slightly larger than the permanent magnets. These gaps can be made narrower by machining precision in the magnet insertion apertures and the permanent magnets, but are required from the viewpoint of the operation in which the permanent magnets are inserted. Thus, fixing positions of the permanent magnets inside the magnet insertion apertures are not determined consistently, and the position of the permanent magnets, of which a plurality are mounted to the rotor core, may be offset from each other. One problem has been that if such misalignments occur, then smooth rotation of the rotor is impeded, and vibration and noise that accompany rotation of the motor are increased.

In consideration of such conditions, in Japanese Patent Laid-Open No. HEI 11-252839, permanent magnets to which adhesive is applied are inserted inside magnet insertion apertures that are formed on a rotor, and the rotor is rotated before the adhesive solidifies, to position the permanent magnets inside the magnet insertion apertures precisely.

In Japanese Patent Laid-Open No. 2000-316243, a magnet material member prior to magnetization is inserted into magnet insertion apertures that are formed on a rotor, an adhesive is injected into the magnet insertion apertures into which the magnet material member has been inserted, and the rotor is rotated before the adhesive solidifies, to position the permanent magnets inside the magnet insertion apertures precisely.

In Japanese Patent Laid-Open No. HEI 11-252839, no mention is made as to how the adhesive is applied to the permanent magnets. Since the gaps between the magnet insertion apertures and the permanent magnets that are inserted into the magnet insertion apertures are set so as to be narrow, if the adhesive is applied all over the permanent magnets, or if the quantity of adhesive applied is large, then the adhesive may be scraped off at the entrances to the magnet insertion apertures when inserting the permanent magnets. Thus, the amount of adhesive for bonding the permanent magnets is not ensured, and one problem has been that stable adhesive force cannot be ensured. In addition, another problem has been that a step is required to remove the adhesive that has been scraped off at the entrances of the magnet insertion apertures and has adhered to the entrances of the magnet insertion apertures.

In Japanese Patent Laid-Open No. 2000-316243, the adhesive is injected into the magnet insertion apertures after inserting the magnet material member into the magnet insertion apertures. However, since the gaps between the magnet insertion apertures and the magnet material member that is inserted into the magnet insertion apertures are set so as to be narrow, not only is it difficult for the adhesive to enter the slight gaps between the magnet material member and the magnet insertion apertures, but because it is not possible to check that the adhesive has entered the slight gaps between the magnet material member and the magnet insertion apertures, one problem has been that stable adhesive force cannot be ensured.

SUMMARY OF THE INVENTION

The present invention aims to solve the above problems and an object of the present invention is to provide a manufacturing method for a rotor for a rotary electric machine in which magnet material members to which an adhesive has been applied can be inserted smoothly into magnet insertion apertures without the adhesive being scraped off at entrances of the magnet insertion apertures, that can ensure a stable adhesive force, and in which the magnet material members can also be positioned inside the magnet insertion apertures precisely.

A manufacturing method for a rotor for a rotary electric machine according to the present invention includes: a rotor core; a rotating shaft that is fixed to a central axial position of the rotor core; magnet insertion apertures that are arranged circumferentially so as to each have an aperture direction in an axial direction so as to pass axially through the rotor core; a permanent magnet that is inserted into each of the magnet insertion apertures; and an adhesive that fixes the permanent magnet to the magnet insertion aperture, and includes steps of: applying the adhesive to a first surface of a magnet material member that becomes the permanent magnet after magnetization, the adhesive being applied such that a total thickness of the magnet material member and the adhesive is less than a radial width of the magnet insertion aperture; disposing the rotor core such that the axial direction thereof is horizontal, and inserting the magnet material member into a magnet insertion aperture that is positioned vertically uppermost among the magnet insertion apertures so as to orient the adhesive vertically upward; positioning each of the magnet material members by pressing the magnet material member against an inner wall surface on an outer circumferential side of the magnet insertion aperture after inserting the magnet material member into each of the magnet insertion apertures; and curing the adhesive after the magnet material member is positioned.

According to the present invention, an adhesive is applied to a first surface of a magnet material member such that a total thickness of the magnet material member and the adhesive is less than a radial width of a magnet insertion aperture, and a rotor core is disposed such that an axial direction thereof is horizontal, and the magnet material member is inserted into a magnet insertion aperture that is positioned vertically uppermost so as to orient the adhesive vertically upward. Thus, because the magnet material members to which the adhesive has been applied can be inserted smoothly into the magnet insertion apertures without the adhesive being scraped off at entrances of the magnet insertion apertures, stable adhesive force can be ensured.

Because the adhesive is cured after the magnet material members are positioned, the magnet material members can be positioned and fixed precisely inside the magnet insertion apertures.

DETAILED DESCRIPTION OF THE PREFERRED EMBODIMENTS

Embodiment 1

Figure 1:
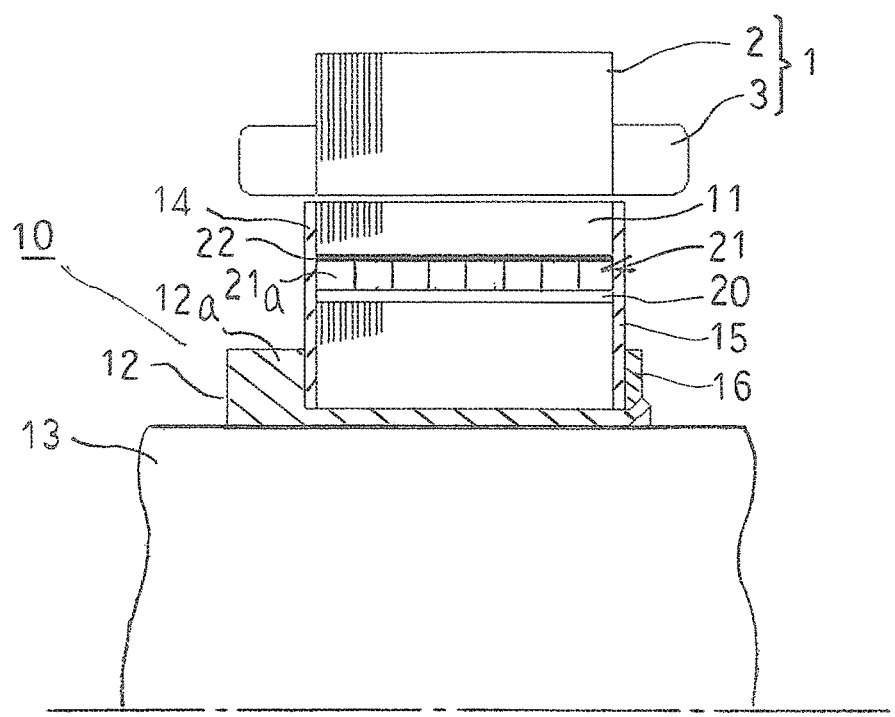
FIG. 1 is a half section that shows a motor according to Embodiment 1 of the present invention.
Figure 2:
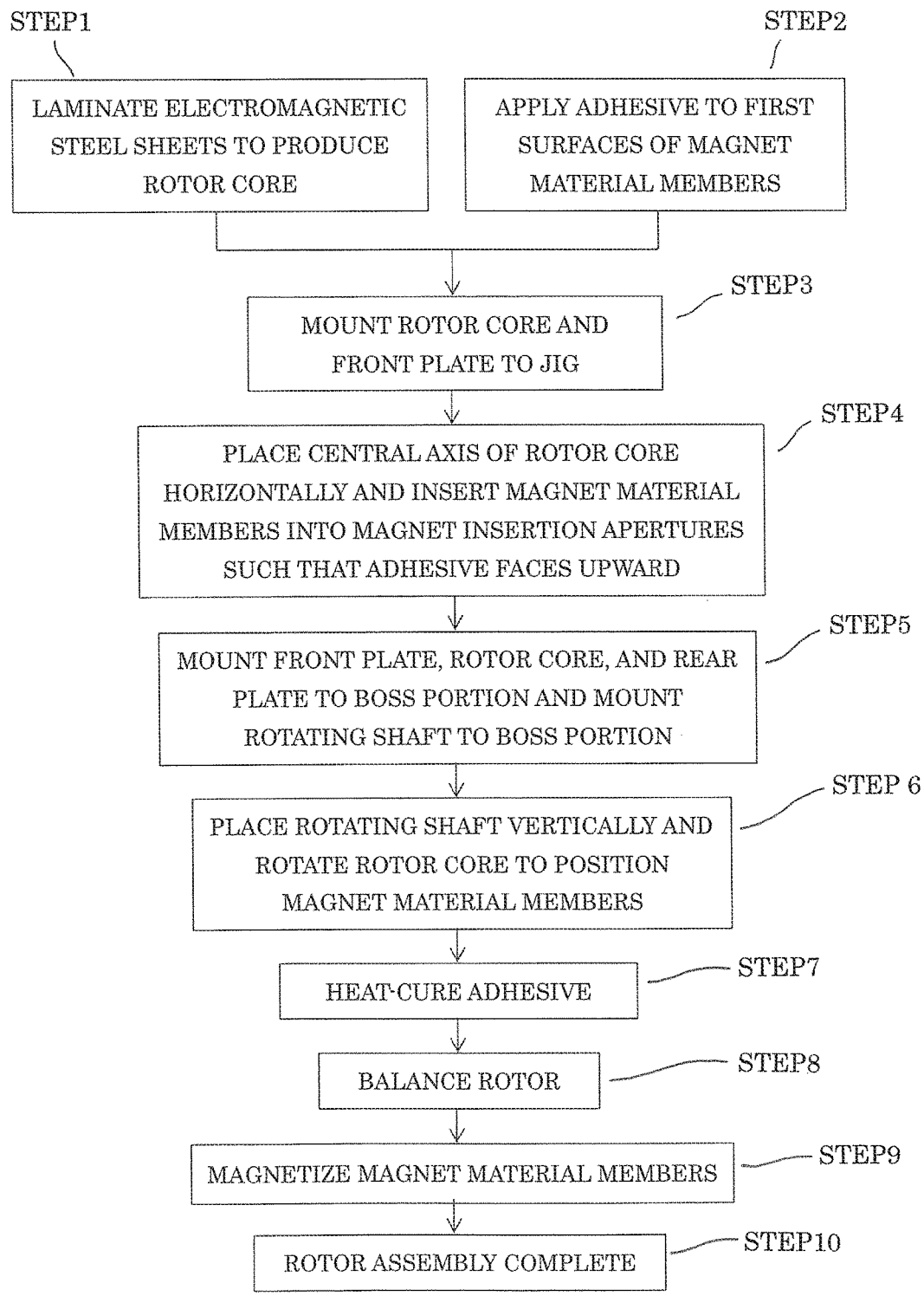
FIG. 2 is a flow chart of a manufacturing method for a rotor of the motor according to Embodiment 1 of the present invention.
Figure 3:
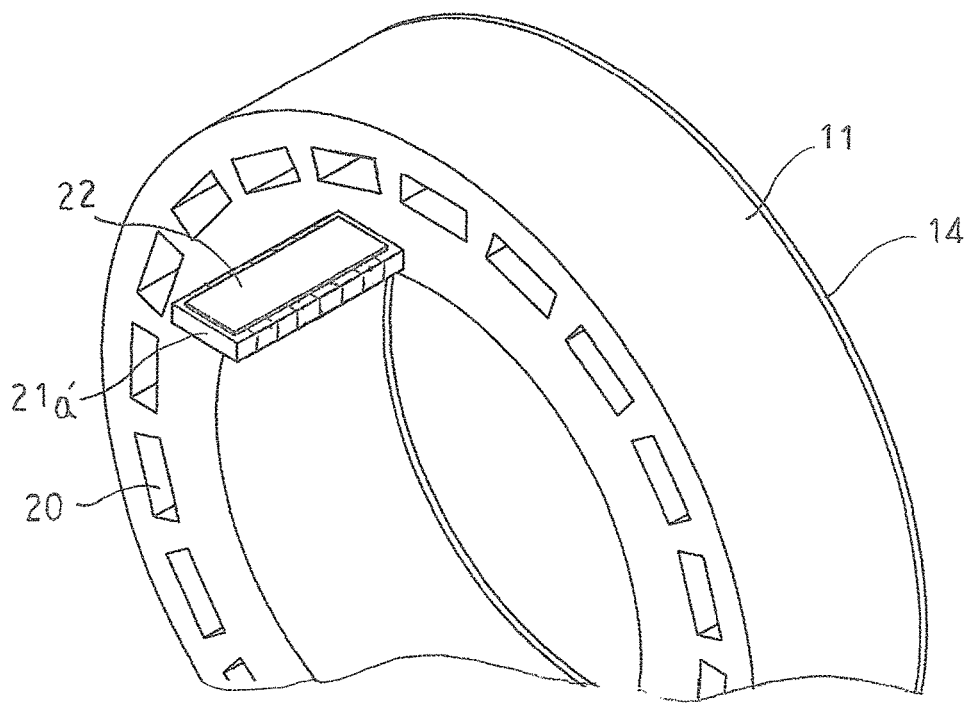
FIG. 3 is a partial oblique projection that explains a step of inserting a magnet material member in the manufacturing method for the rotor of the motor according to Embodiment 1 of the present invention.
Figure 4:
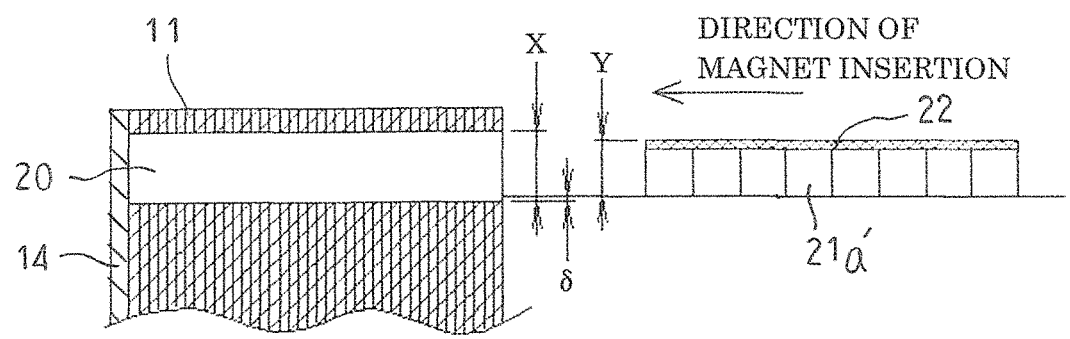
FIG. 4 is a partial cross section that explains the step of inserting the magnet material member in the manufacturing method for the rotor of the motor according to Embodiment 1 of the present invention.
Figure 5:
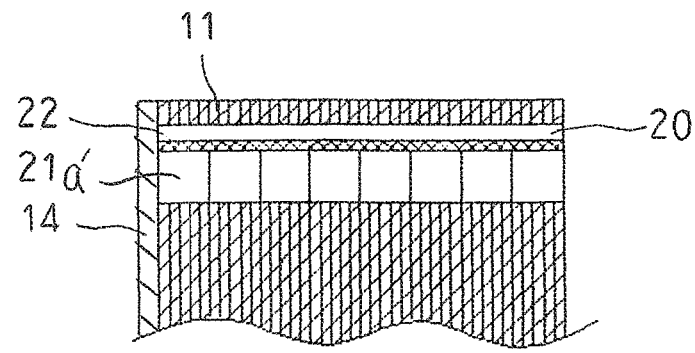
FIG. 5 is a partial cross section that shows a rotor core after insertion of the magnet material member in the manufacturing method for the rotor of the motor according to Embodiment 1 of the present invention.
Figure 6:
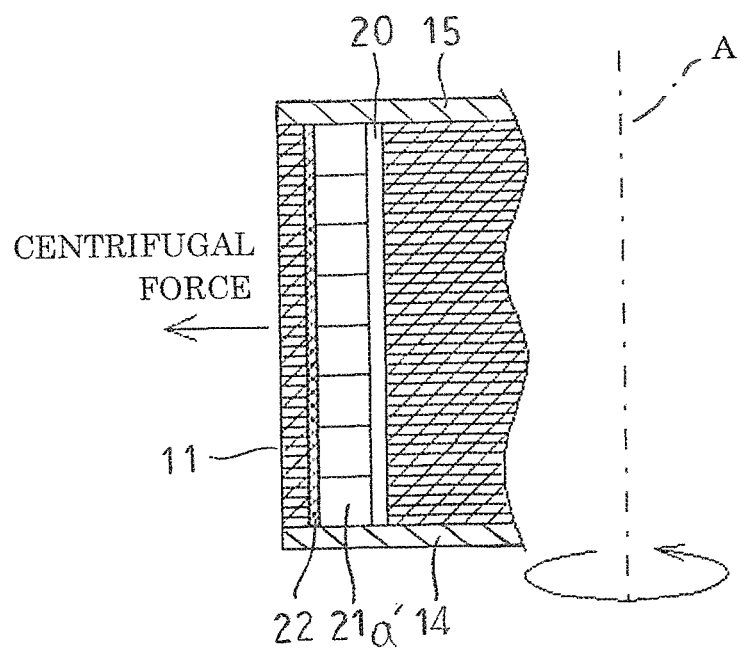
FIG. 6 is a partial cross section that explains a step of positioning the magnet material member in the manufacturing method for the rotor of the motor according to Embodiment 1 of the present invention.

FIG. 1 is a half section that shows a motor according to Embodiment 1 of the present invention, FIG. 2 is a flow chart of a manufacturing method for a rotor of the motor according to Embodiment 1 of the present invention, FIG. 3 is a partial oblique projection that explains a step of inserting a magnet material member in the manufacturing method for the rotor of the motor according to Embodiment 1 of the present invention, FIG. 4 is a partial cross section that explains the step of inserting the magnet material member in the manufacturing method for the rotor of the motor according to Embodiment 1 of the present invention, FIG. 5 is a partial cross section that shows a rotor core after insertion of the magnet material member in the manufacturing method for the rotor of the motor according to Embodiment 1 of the present invention, and FIG. 6 is a partial cross section that explains a step of positioning the magnet material member in the manufacturing method for the rotor of the motor according to Embodiment 1 of the present invention.

In FIG. 1, a motor 100 that functions as a rotary electric machine includes: a stator 1; and a rotor 10 that is disposed rotatably and coaxially on an inner circumferential side of the stator 1.

The stator 1 includes: a stator core 2 that is formed by laminating and integrating electromagnetic steel sheets that have a sheet thickness of 0.3 min through 0.5 min that are coated with insulation; and a stator winding 3 that is mounted to the stator core 2. Although not shown, the stator core 2 includes: an annular core back; and a plurality of teeth that each protrude radially inward from an inner circumferential surface of the core back so as to be arranged circumferentially.

The rotor 10 includes: an annular rotor core 11 that is formed by laminating and integrating electromagnetic steel sheets that have a sheet thickness of 0.3 mm through 0.5 mm that are coated with insulation; an annular boss portion 12 that is inserted into and fixed to a central aperture of the rotor core 11 to hold the rotor core 11; and a rotating shaft 13 that is inserted into and fixed to a central axial position of the boss portion 12. End plates that are constituted by a front plate 14 and a rear plate 15 are disposed on two axial ends of the rotor core 11. The laminated body of the rotor core 11 and the end plates are mounted to the boss portion 12 such that the front plate 14 is placed in contact with a receiving portion 12a of the boss portion 12. A stopper 16 is mounted to the boss portion 12 so as to contact the rear plate 15. The boss portion 12 is crimped such that the laminated body of the rotor core 11 and the end plates are held by the boss portion 12 so as to be pressed and held between the receiving portion 12a and the stopper 16 such that axial movement is restricted.

The rotor 10 that is configured in this manner is disposed coaxially on an inner circumferential side of the stator 1 so as to have an air gap of approximately 0.5 mm through 1.0 mm interposed from the stator core 2.

Moreover, the rotor core 11 is produced by laminating electromagnetic steel sheets, but may be produced using a solid body of magnetic material. Furthermore, the rotor core 11 is held so as to be coaxial with the rotating shaft 13 so as to have the boss portion 12 interposed, but the boss portion 12 may be omitted, and the rotor core 11 held directly on the rotating shaft 13.

As shown in FIG. 3, a plurality of magnet insertion apertures 20 are each formed on an outer circumferential portion of the rotor core 11 so as to extend from a first end to a second end in an axial direction of the rotor core 11 such that aperture directions are parallel to a central axis of the rotating shaft 13, and are arranged at a uniform angular pitch circumferentially. Here, the magnet insertion apertures 20 are formed so as to have an aperture shape that has an oblong cross-sectional shape perpendicular to the axial direction of the rotor core 11 such that long sides of the oblong cross section are perpendicular to a radial direction of the rotor core 11.

The permanent magnets 21 have an oblong cross section that is slightly smaller than the oblong cross section of the magnet insertion apertures 20, and are formed into parallelepipeds that have a length that is equal to an axial length of the magnet insertion apertures 20. The permanent magnets 21 are housed and held inside the respective magnet insertion apertures 20 such that only an upper surface thereof is fixed adhesively to an inner wall surface on an outer circumferential side of the magnet insertion apertures 20 using an adhesive 22. Here, the permanent magnets 21 are configured by arranging eight magnet segments 21*a* in a single column.

The front plate 14 and the rear plate 15 are disposed on the two axial ends of the rotor core 11, preventing dislodgment of the permanent magnets 21 from the magnet insertion apertures 20.

A rotating magnetic field is formed inside the stator 1 of the motor 100 that is configured in this manner by passing alternating current to the stator winding. The rotating magnetic field is applied to the permanent magnets 21 of the rotor 10, such that the rotor 10 is driven to rotate.

In this rotor 10, because the permanent magnets 21 are fixed to the inner wall surface on the outer circumferential side of the magnet insertion apertures 20, magnetic leakage flux of the magnet magnetic flux is reduced, enabling output from the motor 100 to be improved.

Next, a manufacturing method for the rotor 10 will be explained.

First, the rotor core 11 is produced by laminating and integrating the electromagnetic steel sheets (Step 1). Furthermore, eight magnet material members 21*a'* that become the magnet segments 21*a* after magnetization are arranged in single columns, and an adhesive 22 is applied to a first surface of all of the arranged magnet material members 21*a'* (Step 2). Here, a thermosetting adhesive is used as the adhesive 22. An applied thickness of the adhesive 22 is managed so as to satisfy Y<X where Y is a total thickness of the magnet material members 21*a'* and the adhesive 22, and X is a radial width of the magnet insertion apertures 20.

Next, the front plate 14 is disposed on the first axial end of the rotor core 11, and is fixed to the rotor core 11 by crimping. Next, the rotor core 11 with which the front plate 14 is integrated is mounted to a jig (not shown) (Step 3). Next, as shown in FIGS. 3 and 4, while rotating the rotor core 11 such that a central axis thereof is horizontal, a group of magnet material members 21*a'* that are arranged in a single column in which the coated surface of the adhesive 22 is oriented upward is inserted into the magnet insertion aperture 20 that is positioned uppermost in a vertical direction, in which the long sides of the oblong cross section are horizontal (Step 4). As shown in FIG. 5, the group of magnet material members 21*a'* that is arranged in a single column is thereby mounted onto an inner wall surface on the inner circumferential side of the magnet insertion aperture 20, and is housed inside the magnet insertion aperture 20 such that a gap is ensured between the adhesive 22 and the inner wall surface on the outer circumferential side of the magnet insertion aperture 20.

After groups of magnet material members 21*a'* are inserted inside all of the magnet insertion apertures 20, the rotor core 11 is removed from the jig, and is mounted to the boss portion 12, the rear plate 15 and the stopper 16 are mounted to the boss portion 12, and the stopper 16 is fixed by crimping. The front plate 14, the rotor core 11, and the rear plate 15 are thereby held by the boss portion 12 so as to be pressed and held between the receiving portion 12*a* and the stopper 16 such that axial movement is restricted. Next, the rotating shaft 13 is mounted to the boss portion 12 (Step 5). Next, as shown in FIG. 6, the central axis A of the rotating shaft 13 is oriented vertically, and the rotor core 11 is rotated by rotating the rotating shaft 13, to position the magnet material members 21*a'* (Step 6).

Next, the rotor core 11 is placed inside a heating furnace so as to be oriented such that the central axis of the rotating shaft 13 is vertical, and is heated to a curing temperature of the adhesive 22 to cure the adhesive 22 (Step 7). Then, after curing of the adhesive 22, the rotor core 11 is removed from the heating furnace, and balancing of the rotor 10 is performed (Step 8), and the magnet material members 21*a'* are magnetized (Step 9). The magnet material members 21*a'* are thereby magnetized to become magnet segments 21*a*, completing assembly of the rotor assembly (Step 10).

In Embodiment 1, the applied thickness of the adhesive 22 is managed so as to satisfy Y<X, where Y is the total thickness of the magnet material members 21*a'* and the adhesive 22, and X is the radial width of the magnet insertion apertures 20. Thus, when inserting the groups of magnet material members 21*a'* into the magnet insertion apertures 20, the adhesive will not be scraped off at the entrances to the magnet insertion apertures. The amount of adhesive 22 for bonding the permanent magnets 21 is thereby ensured, enabling stable adhesive force to be ensured. In addition, because the adhesive 22 will not be scraped off at the entrances of the magnet insertion apertures 20 and adhere to the entrances of the magnet insertion apertures 20, an operation for removing adhesive that adheres to the entrances of the magnet insertion apertures 20 is no longer required, improving assembly of the rotor 10.

The adhesive 22 is applied only to a first surface of a group of magnet material members 21*a'* that are arranged in a single column without leaving gaps. Thus, because the adhesive 22 can be applied stably to a uniform thickness using masking, etc., the quantity of adhesive 22 applied can be managed, enabling stable adhesive force to be ensured. In addition, because the groups of magnet material members 21*a'* can be inserted so as to slide on the inner wall surface on the inner circumferential side of the magnet insertion apertures 20, the gaps between the inner wall surfaces on the outer circumferential sides of the magnet insertion apertures 20 and the adhesive 22, i.e., (X−Y), can be reduced.

The rotor core 11 is rotated by rotating the rotating shaft 13 with the magnet material members 21*a'* inserted inside the magnet insertion apertures 20. Thus, as shown in FIG. 6, centrifugal forces acts on the magnet material members 21*a'*, subjecting the magnet material members 21*a'* to radially outward forces. The magnet material members 21*a'* are thereby pressed against the inner wall surfaces on the outer circumferential sides of the magnet insertion apertures 20. In addition, angular acceleration acts on the magnet material members 21*a'*, subjecting the magnet material members 21*a'* to forces that are tangential to the rotor core 11. The magnet material members 21*a'* are thereby pressed against inner wall surfaces of the magnet insertion apertures 20 that are forward in the direction of rotation of the rotating shaft 13. Because the centrifugal force and the angular acceleration each act on all of the magnet material members 21*a'* equally, irregularities in the position of the magnet material members 21*a'* inside the magnet insertion apertures 20 are reduced. In other words, the permanent magnets 21 can be positioned inside the magnet insertion apertures 20 precisely.

Consequently, because irregularities in the positions of the permanent magnets 21 inside all of the magnet insertion apertures 20 are suppressed, the motor 100 can be rotated more smoothly, enabling the generation of vibration and noise that results from rotation of the motor 100 to be suppressed.

Because the rotor core 11 is disposed such that the central axis of the rotating shaft 13 is vertical during the step of curing the adhesive 22, the adhesive 22 can be cured without the magnet material members 21a' separating from the inner wall surfaces on the outer circumferential sides of the magnet insertion apertures 20. The magnet material members 21a' are thereby fixed to the rotor core 11 in a positioned state.

Here, in order to avoid interference with the magnet insertion apertures 20, the magnet material members 21a' that are arranged in a single column are inserted into the magnet insertion apertures 20 so as to be raised by δ radially above the inner wall surfaces on the radially inner sides of the magnet insertion apertures 20, as shown in FIG. 4. Thus, in consideration of workability when inserting the magnet material members 21a' into the magnet insertion apertures 20, it is desirable to manage the applied thickness of the adhesive 22 so satisfy Y+δ<X. Moreover, δ is greater than 0 min.

Moreover, in Embodiment 1 above, the permanent magnets are each configured by arranging eight magnet segments in a single column in an axial direction of the rotor core, but permanent magnets may each be constituted by an integrated body.

Figure 7:
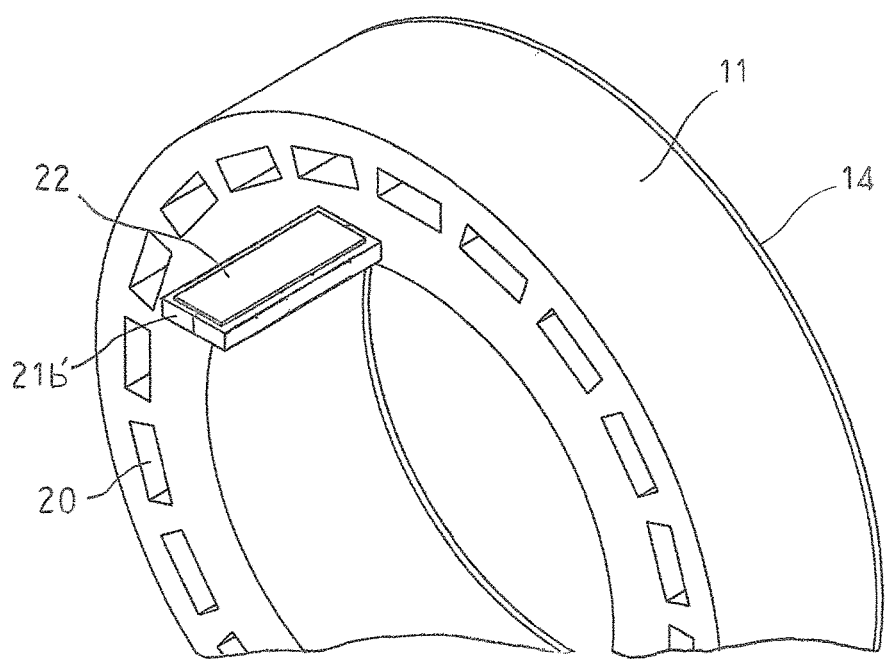
FIG. 7 is a partial oblique projection that explains a step of inserting a magnet material member of a variation in the manufacturing method for the rotor of the motor according to Embodiment 1 of the present invention.

The permanent magnets are divided into eight segments in the axial direction of the rotor core, but the number of segments in the permanent magnets in the axial direction of the rotor core is not limited to eight. As shown in FIG. 7, the permanent magnets may each be configured by arranging magnet material members 21b' that become two magnet segments in a circumferential direction of the rotor core 11 after magnetization. Furthermore, the number of segments in the permanent magnets in the circumferential direction of the rotor core 11 is not limited to two.

In Embodiment 1 above, the step of positioning the magnet material members and the step of curing the adhesive are separate steps, but the step of positioning the magnet material members and the step of curing the adhesive may be a single step. In that case, the rotor core is heated while being rotated, the magnet material members are positioned as the temperature rises, and the adhesive is cured when the temperature becomes greater than or equal to the curing temperature of the adhesive. Furthermore, because the rotor core is rotated, it is not necessary for the central axis of the rotor core to be vertical, and the central axis of the rotor core may be horizontal.

Embodiment 2

Figure 8:
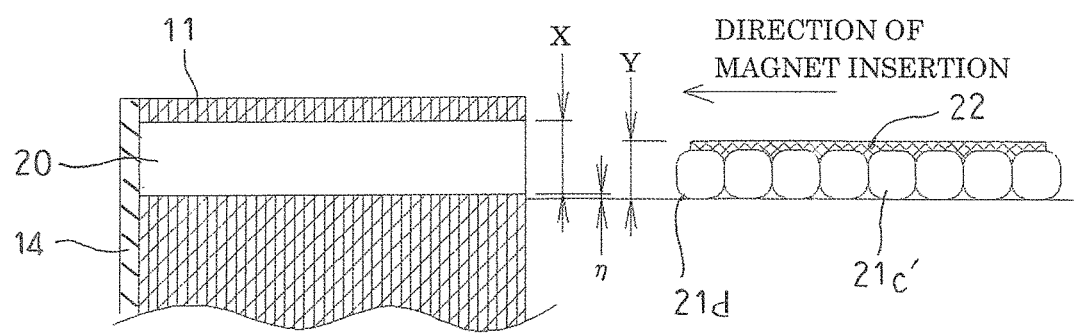
FIG. 8 is a partial cross section that explains an insertion method for a magnet material member in a manufacturing method for a rotor of a motor according to Embodiment 2 of the present invention.

FIG. 8 is a partial cross section that explains an insertion method for a magnet material member in a manufacturing method for a rotor of a motor according to Embodiment 2 of the present invention.

In FIG. 8, a permanent magnet is configured by dividing a parallelepiped that has an oblong cross section into eight magnet segments in a longitudinal direction thereof. Intersecting portions between two end surfaces in a direction of arrangement of magnet material members 21c' that become the magnet segments after magnetization and upper and lower surfaces of the magnet material members 21c' are rounded.

Moreover, the rest of the configuration is formed in a similar or identical manner to that of Embodiment 1 above.

In Embodiment 2, a group of eight magnet material members 21c' that are arranged in a single column, to one surface of which an adhesive 22 is applied, are also inserted into each of the magnet insertion apertures 20 of the rotor core 11, the magnet material members 21c' are positioned by rotating the rotor core 11, and then the adhesive 22 is heat-cured in a similar or identical manner to Embodiment 1 above.

Consequently, similar or identical effects to those in Embodiment 1 above can also be achieved in Embodiment 2.

In Embodiment 2, intersecting portions between two end surfaces in a direction of arrangement of magnet material members 21c' and upper and lower surfaces of the magnet material members 21c' are rounded. Groups of magnet material members 21c' that are arranged in a single column are inserted into the magnet insertion apertures 20 so as to be lowered by η radially below the inner wall surfaces on the inner circumferential sides of the magnet insertion apertures 20, as shown in FIG. 8. Here, the rounded portion 21d at the intersecting portion between a first end surface in the direction of arrangement and the lower surface of the magnet material members 21c' is first placed in contact with the intersecting corner portion between the inner wall surface on the inner circumferential side of the magnet insertion aperture 20 and the end surface of the rotor core 11. Next, the rounded portion 21d is slid over the intersecting corner portion in question, and the magnet material members 21c' are moved vertically upward while being inserted into the magnet insertion apertures 20. In this manner, the magnet material members 21c' are inserted smoothly into the magnet insertion apertures 20. Moreover, η is set so as to be less than a radial dimension of the rounded portion 21d when the magnet material members 21c' are inserted into the magnet insertion apertures 20.

In this manner, according to Embodiment 2, workability when inserting the magnet material members 21c' that are arranged in a single column into the magnet insertion apertures 20 is improved. Furthermore, the occurrence of scraping off of the adhesive 22 at the entrances of the magnet insertion apertures 20 can be reliably suppressed. In addition, when inserting the magnet material members 21c' into the magnet insertion apertures 20, because it is not necessary to raise the magnet material members 21c' radially outward relative to the inner wall surfaces on the inner circumferential sides of the magnet insertion apertures 20 for insertion, the gaps between the inner wall surfaces on the outer circumferential sides of the magnet insertion apertures 20 and the adhesive 22, i.e., (X−Y), can be minimized. Because the gaps between the permanent magnets 21 and the inner wall surfaces on the inner circumferential sides of the magnet insertion apertures 20 are thereby minimized, permeance is increased in the magnetic circuit, enabling effects to be achieved that increase the amount of magnetic flux from the magnets.

Moreover, in Embodiment 2 above, intersecting portions between the two end surfaces in the direction of arrangement and the upper and lower surfaces of the magnet material members are rounded, but it is not necessary to round the four intersecting portions between the two end surfaces in the direction of arrangement and the upper and lower surfaces of the magnet material members, provided that when inserting a magnet material member into a magnet insertion aperture at least the intersecting portion between the end surface of the magnet material member that faces the magnet insertion aperture and the lower surface is rounded.

In Embodiment 2, the intersecting portions between the two end surfaces in the direction of arrangement and the upper and lower surfaces of the magnet material members are rounded, but the intersecting portions between the two end surfaces in the direction of arrangement and the upper and lower surfaces of the magnet material members may alternatively be chamfered.

Embodiment 3

Figure 9:
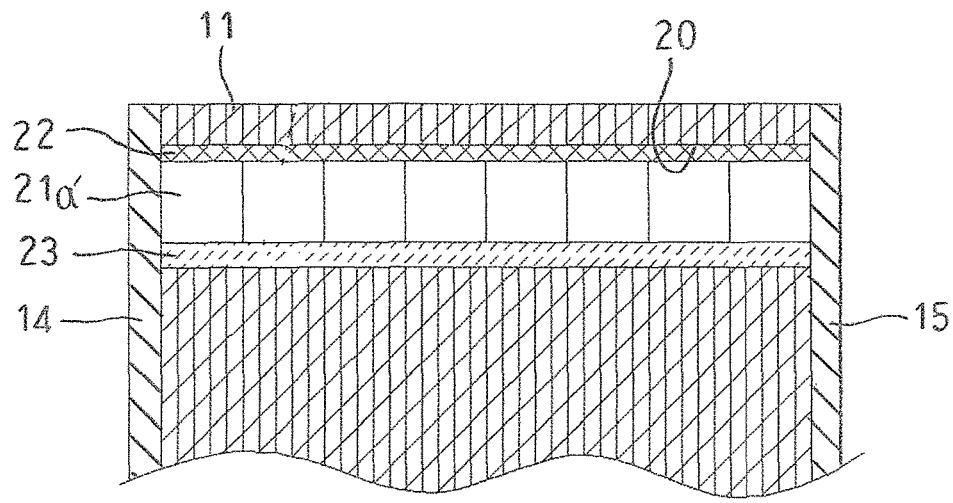
FIG. 9 is a partial cross section that shows a magnet material member that has been positioned and fixed inside a magnet insertion aperture in a manufacturing method for a rotor of a motor according to Embodiment 3 of the present invention.

FIG. 9 is a partial cross section that shows a magnet material member that has been positioned and fixed inside a magnet insertion aperture in a manufacturing method for a rotor of a motor according to Embodiment 3 of the present invention.

In Embodiment 3, an adhesive 22 is applied to a first surface of eight magnet material members 21a' that are arranged in a single column, and a foam sheet 23 is disposed on a second surface. Next, groups of magnet material members 21a' to which the adhesive 22 has been applied and foam sheets 23 are inserted into respective magnet insertion apertures 20 of a rotor core 11 with which a front plate 14 is integrated, and that is mounted to a jig, in a similar or identical manner to Embodiment 1 above. The rotor core 11 with which the front plate 14 is integrated is removed from the jig, and is mounted to the boss portion 12, the rear plate 15 and the stopper 16 are also mounted to the boss portion 12, and the stopper 16 is fixed by crimping. Next, the rotating shaft 13 is mounted to the boss portion 12.

Next, the rotor core 11 that is held by the rotating shaft 13 is housed inside a heating furnace, to heat-cure the adhesive 22. Here, as the temperature rises, the thermosetting resin of the foam sheet 23 is softened, and the foaming agent that is built into the foam sheet 23 foams, increasing the volume of the foam sheet 23. The magnet material members 21a' are thereby pressed against inner wall surfaces on the outer circumferential sides of the magnet insertion apertures 20. Next, the thermosetting resin of the foam sheet 23 cures with the magnet material members 21a' pressed against the inner wall surfaces on the outer circumferential sides of the magnet insertion apertures 20, positioning the magnet material members 21a' inside the magnet insertion apertures 20. The adhesive 22 is also cured with the magnet material members 21a' positioned inside the magnet insertion apertures 20. Next, balancing of the rotor is performed, and magnetization of the magnet material members 21a' is also performed.

Here, air bubble groups arise inside the foam sheet 23 due to heating, increasing the thickness thereof. The foam sheet 23 is heated to a temperature that is greater than or equal to the curing temperature of the thermosetting resin, and is cured in a state of increased thickness.

Consequently, similar or identical effects to those in Embodiment 1 above can also be achieved in Embodiment 3.

Moreover, in Embodiment 3 above, the step of positioning the magnet material members and the step of curing the adhesive are performed in a single step, but the step of positioning the magnet material members and the step of curing the adhesive may be separate steps.

In Embodiment 3 above, because the foam sheets 23 that are disposed between the magnet material members and the inner wall surfaces on the inner circumferential sides of the magnet insertion apertures are expanded and cured to position the magnet material members, it is not necessary for the central axis of the rotor core to be made vertical in the step of positioning the magnet material members and the step of curing the adhesive, and the central axis of the rotor core may be horizontal.

In Embodiment 3 above, a thermosetting resin that does not exhibit adhesiveness when solidified at normal temperatures or when cured is used as the foam sheet, but a thermosetting resin that does not exhibit adhesiveness when solidified at normal temperatures, but that exhibits adhesiveness when cured, for example, may be used as the foam sheet.

Embodiment 4

Figure 10:
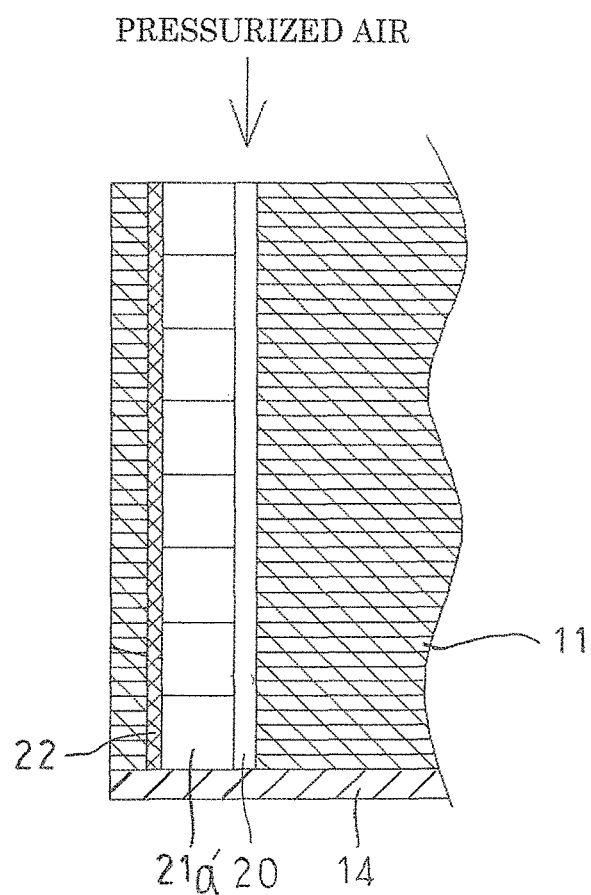
FIG. 10 is a partial cross section that shows a magnet material member that has been positioned and fixed inside a magnet insertion aperture in a manufacturing method for a rotor of a motor according to Embodiment 4 of the present invention.

FIG. 10 is a partial cross section that shows a magnet material member that has been positioned and fixed inside a magnet insertion aperture in a manufacturing method for a rotor of a motor according to Embodiment 4 of the present invention.

In Embodiment 4, an adhesive 22 is applied to a first surface of eight magnet material members 21a' that are arranged in a single column, and groups of magnet material members 21a' to the first surface of which the adhesive 22 has been applied are inserted into respective magnet insertion apertures 20 of a rotor core 11 with which a front plate 14 is integrated, in a similar or identical manner to Embodiment 1 above.

The rotor core 11 with which the front plate 14 is integrated is removed from the jig, and is mounted to the boss portion 12, and the rotating shaft 13 is mounted to the boss portion 12. Next, as shown in FIG. 10, the rotor core 11 is disposed such that the central axis of the rotating shaft 13 is vertical, and air is blown under pressure between surfaces on the inner circumferential sides of the magnet material members 21a' and the inner wall surfaces on the inner circumferential sides of the magnet insertion apertures 20, pressing the magnet material members 21a' against the inner wall surfaces on the outer circumferential sides of the magnet insertion apertures 20. Next, the rotor core 11 is disposed inside a heating furnace such that the central axis of the rotating shaft 13 is vertical, to heat-cure the adhesive 22. The magnet material members 21a' are thereby fixed inside the magnet insertion apertures 20 in a positioned state. Next, the rear plate 15 and the stopper 16 are mounted to the boss portion 12, and the stopper 16 is fixed by crimping. In addition, balancing of the rotor is performed, and magnetization of the magnet material members 21a' is also performed.

Consequently, similar or identical effects to those in Embodiment 1 above can also be achieved in Embodiment 4.

In Embodiment 4 above, the step of positioning the magnet material members and the step of curing the adhesive are separate steps, but the step of positioning the magnet material members and the step of curing the adhesive may be a single step. In that case, the air is supplied between the surfaces on the inner circumferential sides of the magnet material members and the inner wall surfaces on the inner circumferential sides of the magnet insertion apertures while heating, the magnet material members are positioned as the temperature rises, and the adhesive is cured when the temperature becomes greater than or equal to the curing temperature of the adhesive. Furthermore, because the air is supplied, it is not necessary for the central axis of the rotor core to be vertical, and the central axis of the rotor core may be horizontal.

Moreover, in each of the above embodiments, a thermosetting adhesive is used as the adhesive, but the adhesive is not limited to a thermosetting adhesive, and a room temperature setting adhesive or an ultraviolet setting resin can be used, for example.

In each of the above embodiments, an epoxy resin is used as an adhesive material, but the adhesive material is not limited to an epoxy resin, and a silicone resin or an acrylic resin can be used, for example.

In each of the above embodiments, the permanent magnets are produced into parallelepipeds that have an oblong cross section, but the cross section of the permanent magnets is not limited to being oblong, and may be a circular arc shape or a semicylinder, for example. In that case, the magnet insertion apertures are formed so as to have an aperture shape that has a cross section that conforms to the cross-sectional shape of the permanent magnets.

What is claimed is:

1. A manufacturing method for a rotor for a rotary electric machine that comprises:
    a rotor core;
    a rotating shaft that is fixed to a central axial position of said rotor core;
    magnet insertion apertures that are arranged circumferentially so as to each have an aperture direction in an axial direction so as to pass axially through said rotor core;
    a permanent magnet that is inserted into each of said magnet insertion apertures; and
    an adhesive that fixes said permanent magnet to said magnet insertion aperture,
    wherein said manufacturing method comprises steps of:
    applying said adhesive to a first surface of a magnet material member that becomes said permanent magnet after magnetization, said adhesive being applied such that a total thickness of said magnet material member and said adhesive is less than a radial width of said magnet insertion aperture;
    after applying said adhesive, disposing said rotor core such that said axial direction thereof is horizontal, and inserting said magnet material member into a magnet insertion aperture that is positioned vertically uppermost among said magnet insertion apertures so as to orient said adhesive vertically upward;
    positioning each of said magnet material members by pressing said magnet material member against an inner wall surface on an outer circumferential side of said magnet insertion aperture after inserting said magnet material member into each of said magnet insertion apertures; and
    curing said adhesive after said magnet material member is positioned,
    wherein said adhesive is applied to the first surface of the magnet material member without being applied to any other surface of the magnet material member.

2. The manufacturing method for a rotor for a rotary electric machine according to claim 1, wherein in said step of positioning said magnet material member, said magnet material member is pressed against said inner wall surface on said outer circumferential side of each of said magnet insertion apertures by rotating said rotor core around a central axis.

3. The manufacturing method for a rotor for a rotary electric machine according to claim 1, wherein in said step of positioning said magnet material member, said magnet material member is pressed against said inner wall surface on said outer circumferential side of each of said magnet insertion apertures by blowing air under pressure between said inner wall surface on said inner circumferential side of each of said magnet insertion apertures and said magnet material member.

4. The manufacturing method for a rotor for a rotary electric machine according to claim 1, wherein:
    in said step of inserting said magnet material member into said magnet insertion aperture, a foam sheet in which a foaming agent is added to a thermosetting resin is inserted between said inner wall surface on said inner circumferential side of each of said magnet insertion apertures and said magnet material member; and
    in said step of positioning said magnet material member, said magnet material member is pressed against said inner wall surface on said outer circumferential side of each of said magnet insertion apertures by heating said rotor core to a temperature that is greater than or equal to a curing temperature of said thermosetting resin to make said foaming agent foam and to cure said thermosetting resin in an expanded state.

5. The manufacturing method for a rotor for a rotary electric machine according to claim 1, wherein an intersecting portion on said magnet material member between a leading wall surface in a direction of insertion into said magnet insertion aperture and a wall surface on an opposite side from said first surface to which said adhesive is applied is rounded or chamfered.

6. The manufacturing method for a rotor for a rotary electric machine according to claim 5, wherein in said step of inserting said magnet material member, said rounded or chamfered portion is made to slide over an intersecting portion between said inner wall surface on said inner circumferential side of said magnet insertion aperture and an end surface of said rotor core while inserting said magnet material member into said magnet insertion aperture.

7. The manufacturing method for a rotor for a rotary electric machine according to claim 1, wherein said adhesive is a thermosetting adhesive, a room temperature setting adhesive, or an ultraviolet setting resin.

8. The manufacturing method for a rotor for a rotary electric machine according to claim 1, wherein said adhesive is an epoxy adhesive, a silicone adhesive, or an acrylic adhesive.

9. The manufacturing method for a rotor for a rotary electric machine according to claim 1, wherein said magnet material member is divided in said axial direction of said rotor core.

10. The manufacturing method for a rotor for a rotary electric machine according to claim 1, wherein said magnet material member is divided in a circumferential direction of said rotor core.

* * * * *